(12) United States Patent
Poppenga et al.

(10) Patent No.: US 9,141,321 B1
(45) Date of Patent: Sep. 22, 2015

(54) CONFIGURABLE PRINTER SERVER DEVICE

(71) Applicant: Marvell International Ltd., Hamilton (BM)

(72) Inventors: Burt Poppenga, Eagle, ID (US); Raymond C. Asbury, Eagle, ID (US)

(73) Assignee: Marvell International Ltd., Hamilton (BM)

( * ) Notice: Subject to any disclaimer, the term of this patent is extended or adjusted under 35 U.S.C. 154(b) by 0 days.

(21) Appl. No.: 14/174,590

(22) Filed: Feb. 6, 2014

Related U.S. Application Data

(60) Provisional application No. 61/763,164, filed on Feb. 11, 2013.

(51) Int. Cl.
*G06F 3/12* (2006.01)
*H04N 1/40* (2006.01)

(52) U.S. Cl.
CPC ............ *G06F 3/1258* (2013.01); *G06F 3/1206* (2013.01)

(58) Field of Classification Search
CPC ... G06F 3/1204; G06F 3/1288; G06F 3/1236; G06K 15/02
USPC ......... 358/1.1, 1.9, 1.13, 1.15, 1.18; 709/201, 709/203, 213, 219, 223, 224
See application file for complete search history.

(56) References Cited

U.S. PATENT DOCUMENTS

| | | | |
|---|---|---|---|
| 2006/0122848 A1* | 6/2006 | Takagi | 705/1 |
| 2010/0110472 A1* | 5/2010 | Harrington | 358/1.15 |
| 2012/0050793 A1* | 3/2012 | Miyazawa | 358/1.15 |
| 2012/0081740 A1* | 4/2012 | Takagi et al. | 358/1.15 |
| 2013/0100487 A1* | 4/2013 | Busch et al. | 358/1.15 |
| 2014/0036287 A1* | 2/2014 | Byer et al. | 358/1.13 |
| 2014/0347692 A1* | 11/2014 | Iida | 358/1.15 |

* cited by examiner

*Primary Examiner* — Gabriel Garcia

(57) ABSTRACT

In aspects of a configurable print server device, a print server device implements a print server manager that receives a print job request from a requesting device. When the print job request requires transcoding into a printer command set and/or printer language supported by a printer connected to the print server device, the print server manager transcodes the print job. The print server manager can download firmware for installation in a printer and download updated printer firmware from an update server over a network. The print server manager is configurable by executing a script with a script engine to manage print server operations of the print server device. Updated versions of scripts can be downloaded over a network from the update server.

20 Claims, 6 Drawing Sheets

US 9,141,321 B1

CONFIGURABLE PRINTER SERVER DEVICE

RELATED APPLICATION

This application claims priority to U.S. Provisional Application No. 61/763,164 filed Feb. 11, 2013, the disclosure of which is incorporated herein by reference.

BACKGROUND

Some printers require a host computer to download firmware to the printer for installation each time the printer is powered up. However, as mobile computing and communication devices, such as mobile phones, tablet devices, notebook computers, and other network-connected devices become pervasive, many printers may not be connected to a host computer or may only be connected to a host computer on an intermittent basis. As the variety and number of devices connecting to a printer increases, the diversity of printing formats that need to be supported for printing from these devices tends to increase as well. However, many printers do not natively support a network connection and/or or cannot handle the diversity of printing formats typically required by the many mobile computing and communications devices.

SUMMARY

This Summary introduces concepts of a configurable print server device, and the concepts are further described below in the Detailed Description and/or shown in the Figures. Accordingly, this Summary should not be considered to describe essential features nor used to limit the scope of the claimed subject matter.

In general, in one aspect, this application discloses a configurable print server device that (i) includes a network interface for data communication with network-connected devices via a network, and (ii) includes a communication interface for communication with a printer. The print server device implements a print server manager that executes a script with a script engine to support print server operations for the printer. The print server manager identifies a type of the printer from identification information including, e.g., the printer model, version, and/or supported features, to determine if an updated script is available for the type of printer. If an updated script is available, the print server manager can download the updated script from an update server, and execute the updated script, which enables the print server manager to transcode a print job from a printer language supported by a network-connected device into a printer language supported by the printer.

A method is described for executing a print server manager with a processor system of a print server device, where the print server manager executes a generic script to support the operations of the print server manager for the printer. The method also includes identifying the printer based on identification information received from the printer, determining that a script designed for that printer is not available, and then determining that a generic script will support operations of the print server manager with the printer.

A print server system is described with a communication interface for communication with a printer and includes a network interface configured for data communication with network-connected devices. A print server manager in the print server system maintains a script to support print server operations of the print server manager. The print server manager identifies the printer over the communication interface, determines whether a script designed for that printer is available based on identification information received from the printer, and if not, determines that a generic script will support operations of the print server manager for printing with the printer, and then executes the generic script to support the operations of the print server manager.

BRIEF DESCRIPTION OF THE DRAWINGS

Details of a configurable print server device are described with reference to the following Figures. The same numbers may be used throughout to reference like features and components that are shown in the Figures.

DETAILED DESCRIPTION

Figure 1:
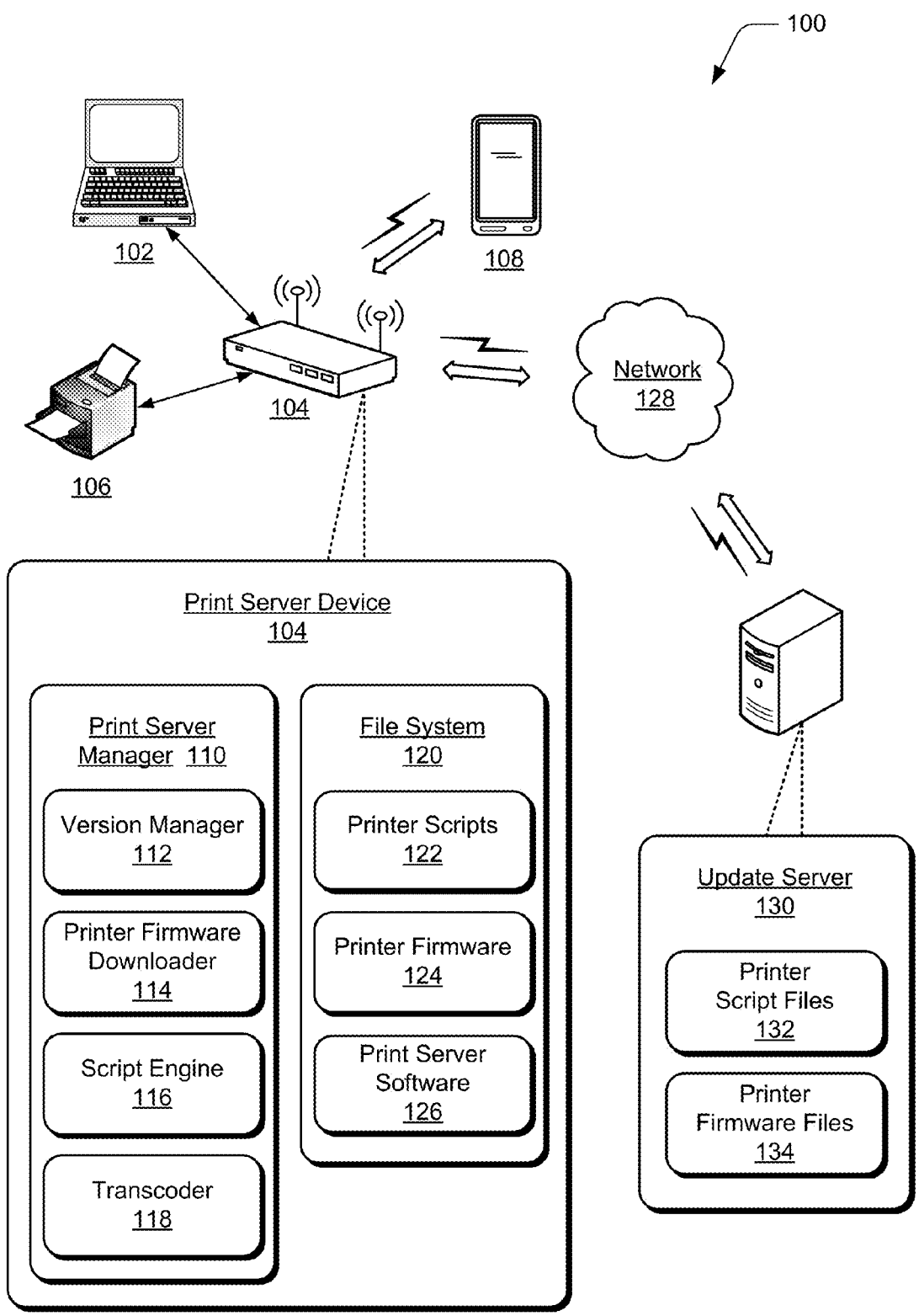
FIG. 1 illustrates an example system in which aspects of a configurable print server device can be implemented.

Printers are often directly connected to a computer over a communication interface, such as a Universal Serial Bus (USB) or other interface, to provide printing capabilities to the computer. The computer may also download updates to the printer's firmware over the communication interface, and in the case of printers that do not maintain a nonvolatile copy of firmware in the printer, download firmware to the printer for installation after a power cycle of the printer. In many instances, the computer also has the capability of connecting across a network interface to download new printer firmware or other software related to the operation of the printer.

As computers become more portable, such as a notebook or laptop computers, and mobile computing and communications devices, such as mobile phones, tablets, or other network connected devices become more pervasive, dependence on a connection to a computer to provide support for downloading printer firmware and for connecting to the printer for printing becomes less desirable. As many legacy printers lack network capability, a print server device can be used to replace the support functions provided by the computer, as well as providing the capability of connecting mobile computing and communication devices to the printer, so that those devices may send print jobs to the printer over their network interfaces via the print server device.

In an example, the print server device connects to a network, such as a wired and/or wireless network. A mobile computing or communication device, which is also connected to the same network, may send a print job to the print server device. The print server manager running in the print server device will then execute operations to print the print job on the printer. As many mobile computing and communication devices may support newer and different printer command sets and/or printer languages for printing than the preconfigured printer command sets and/or printer languages of legacy printers, the print server manager may be configured with a script to transcode the print job sent by the mobile computing or communication device into a printer command set and/or printer language that is compatible with the printer. The print server manager may also be configured to obtain and transcode status information from the printer and send the status information to the mobile computing or communication device. Examples of status information include, but are not limited to, indications of paper jams, an open door, supply levels, print media empty, and the like. The print server manager can also determine whether there is a script that is specifically designed for the type of the printer to which the print server device is connected, or that the printer supports features that can be accessed by executing a generic script, such as a generic script for a particular printer command set or printer language.

When the printer powers up, the printer sends identification information over the communication interface so that the print server manager can determine the type of the printer, from the identification information including for example, the model and version of the printer, as well as the capabilities the printer may support. Some printers retain a nonvolatile copy of firmware that the printer requires for operation, while other printers require that this firmware be downloaded into the printer for installation each time the printer is powered up. In identifying the printer, the print server manager can ascertain if the printer requires firmware to be downloaded to it so that the printer will be operational. The print server manager can also determine if the copy of firmware stored on the print server device is the most recent version of firmware for the printer by checking with an update server over a network. If there is a newer version of firmware for the printer, the print server manager will download that firmware from the update server, store the updated firmware in a file system of the print server device, and download the firmware to the printer for installation.

Periodically, printer-specific and/or generic scripts maintained in the printer server device may be updated. These updates are available from the update server, and the print server device can check to see if the current version of the script in its file system is the most recent version. If a more recent version is available on the update server, the print server manager will download the new script, and store it in the print server device. Checking for updated versions may be initiated in a number of manners including, at each power up of the attached printer, based on time elapsed since the last check for updates, or any other suitable mechanism.

Aspects of a configurable print server device provide that the print server device stores the scripts that control the operation of the print server manager for the particular printer that is connected to the print server device. These scripts can be designed for a specific type of printer or may be generic, such that they support a particular class of printer, a particular printer command set, printer language, and the like. These scripts are executed by a script engine to direct the operation of the print server manager to provide the appropriate print server operations to send a print job to the printer in a manner supported by the printer. This may include transcoding a received print job from a printer language in which the print job was received, such as from a mobile computing or communication device, into a printer language that is supported by, or preconfigured into, the printer.

While features and concepts of a configurable print server device can be implemented in any number of different devices, systems, environments, and/or configurations, aspects of a configurable print server device are described in the context of the following example devices, systems, and methods.

FIG. 1 illustrates an example system 100 in which aspects of a configurable print server device can be implemented. The example system includes a computer 102 which may be connected to a print server device 104 through a communication interface, such as USB. The print server device 104, in turn, is connected to a printer 106 through a second communication interface. When the computer 102, the print server device 104, and the printer 106 are connected in this manner, a print job from the computer 102 will pass through the print server device 104, either unaltered by the print server device 104, or the print server device 104 may be configured to modify the print job, as described below, during the pass through to provide additional features not natively provided in the printer 106. The print job is then communicated to the printer 106 by the print server device 104. In this way, printing from the computer 102 through the print server device 104 appears to the computer 102 and the user of the computer as though the printer 106 is directly connected to the computer 102. Similarly, a firmware download from the computer 102 to the printer 106 will pass through the print server device 104, unaltered by the print server device 104, and be communicated to the printer 106 for installation. Although FIG. 1 only illustrates one connection to the printer 106, it should be noted that any input or output device be connected to the print server device 104 over a communications interface. Outputs from the computer 102 and/or other devices 108 could be sent to other types of output devices, including transcoding formats as necessary, or other inputs can be received at the computer 102 and/or other devices 108 from an input device, such as from a scanner or other input device, and transcoded as necessary from a format supported by the input device into a format supported by the computer 102 or the devices 108.

Additional features provided by the print server device 104 during pass through of a print job from the computer 102 to the printer 106 may include ink or toner reduction, watermarks, headers, footers, barcodes, QR codes or other printing, or document management features. For example, the printer server device 104 may also be configured to capture data for review or hold the print job until the user accepts or approves the print job, such as in the case of the printer 106 containing check blanks and the user wanting to provide additional security or approval steps for printing checks.

Alternatively, the print server device 104 may be connected through a communication interface to the printer 106 without the presence of the computer 102. The print server device 104 can connect to a network 128 through its network communication interface. The network 128 can be implemented using any type of network topology and/or communication protocol, and can be represented or otherwise implemented as a combination of two or more networks, to include IP-based networks and/or the Internet. The network 128 may also include mobile operator networks that are managed by mobile operators, such as a communication service provider, cell-phone provider, and/or Internet service provider.

The example system includes the devices 108, which may be any one or combination of mobile computing or communication devices, such as a mobile phone, tablet device, computing device, communication, entertainment, gaming, navigation, and/or other type of wired or portable electronic device. The devices 108 are generally implemented with a network interface for data communication with network-connected devices via a network. Any of the devices 108 may send a print job to the print server device 104 over the network 128. Additionally, any of the devices 108 can be implemented with various components, such as a processor and/or memory system, as well as any number and combination of differing components as further described with reference to the example device shown in FIG. 6.

In this example system, an update server 130 provides a repository for printer script files 132 and printer firmware files 134 that are accessible to the print server device 104 over the network 128. The update server 130 may also be configured to collect information from the print server device 104, such as usage statistics, connected device types, error logs, or other information that would be useful, for example, to printer manufacturers, printer supply vendors, support agents, or managed print services providers. The print server device 104 can connect over the network 128 to the update server 130 to determine if versions of the printer scripts 122 and/or the printer firmware 124 stored on the print server device 104 are up-to-date, if there are newer versions available, or if there is a printer script and/or printer firmware available for the type of a printer newly connected to the print server device 104, for which a printer script 122 and/or printer firmware 124 are not stored in a file system 120 at the print server device. The printer scripts 122 and the printer firmware 124 stored in the print server device 104 may have been previously downloaded from the update server 130, or may have been preinstalled on the print server device 104 before it was shipped to the user.

The print server device 104 includes a print server manager 110 and a file system 120. The print server manager 110 includes a version manager 112, a printer firmware downloader 114, a script engine 116, and a transcoder 118. The file system 120 stores printer scripts 122, printer firmware 124, and print server software 126. The version manager 112 checks to determine if versions of the printer scripts 122 and/or the printer firmware 124 are the most recent version by comparing the versions stored in the file system 120 with the versions stored as the printer script files 132 and the printer firmware files 134, respectively, on the update server 130. If the version manager 112 determines that any printer script 122 and/or printer firmware 124 is not the most recent version, the most recent version of the printer script 122 and/or printer firmware 124 is downloaded and stored in the file system 120.

When the printer 106 powers up, it enumerates over the communication interface, to the print server device 104, information that the print server device 104 uses to determine the printer type. The enumerated information used to determine the printer type may include the model, version, capabilities, status, such as power-up status, and/or other information relevant to determining the type of the printer 106. The identification information may be in the form of a product ID (PID) and/or vendor ID (VID). The PID and/or VID may be contained in an IEEE 1284 string or any other suitable conveyance, which contains the manufacturer, model, version, and printer command sets and/or printer languages supported by the printer 106. The printer command set and/or printer languages include such information as printer languages, for example PCL, PCLM, PostScript, or other printer command sets and/or printer languages, supported by the printer 106. It should also be understood that the printer 106 may enumerate information at other times, after power up, to the print server device 104, either in response to a request from the printer server device 104 or in response to an event.

From the identification information, the print server manager 110 may determine that printer 106 does not store a nonvolatile copy of the printer firmware 124, and that power has been cycled since the printer firmware 124 was last installed on the printer 106. If it is determined that a firmware download is required, the printer firmware downloader 114 downloads the printer firmware 124 that is stored in the file system 120 to the printer 106 over the communication interface. The printer firmware 124 may have been preinstalled on the print server device 104. If the printer firmware 124 for the printer 106 is not found in the file system 120 of the print server device 104, the version manager 112 can connect to the update server 130 over the network 128 to determine if the printer firmware is available in the printer firmware files 134. If the printer firmware is available in the printer firmware files 134, the version manager 112 can download the printer firmware and store it in the file system 120. If no printer firmware is available either in the file system 120 or from the update server 130, the version manager can provide an indication that there is no firmware available for the printer 106.

Additionally, the print server manager 110 can determine from the identification information which printer script 122 should be executed by the script engine 116 to control the print server software 126 in a manner that sends print jobs to the printer 106, and receives printer status information from the printer 106, using a printer command set and/or printer language that is compatible with the printer 106. The printer script 122 may be written in any appropriate scripting language, such as JavaScript, and executed by a corresponding script engine 116. Typically, the printer scripts 122 are quite small compared to print server software 126. Accordingly, the version manager 112 can download a new or updated printer script 122 very quickly from the update server 130 over the network 128. By designing the printer scripts 122 to be small, the download and installation of updates for the printer scripts 122 can be done quickly enough to be imperceptible to the end-user.

The printer scripts 122 can be either specific to the type of the printer 106, or can be generic to a particular printer command set and/or printer language, such as PCL or PostScript. The print server manager 110 can determine from the identification information if a printer-specific script is available, either stored on the file system 120 of the print server device 104, or stored in the printer script files 132 on the update server 130. If a printer-specific printer script 122 is available and required, then the version manager 112 can download the specific printer script 122 from the update server 130, store the specific printer script 122 in the file system 120, and the script engine 116 can then execute the specific printer script 122. However, if a printer specific script is not available, but a generic script is available, either stored on the file system 120 of the print server device 104, or stored in the printer script files 132 on the update server 130, then the version manager 112 will, if required, download the generic printer script 122 from the update server 130, store the generic printer script 122 in the file system 120, and the script engine 116 can execute the generic script 122.

The devices 108 may discover the print server device 104 over a network interface and transmit print jobs to the printer 106 through the print server device 104. Many contemporary devices 108 may support printer command sets and/or languages, such as Common UNIX Printing System (CUPS) raster, URF, and the like, which are not supported by older printers, which support legacy printer command sets and/or printer languages. When the print server manager 110 receives a print job in a printer command set and/or printer language not supported by the printer 106, the script engine 116 can execute the printer script 122 using the transcoder 118 to transcode the print job from the printer command set and/or printer language in which it was received, to a printer command set and/or printer language that is supported by the printer 106, and transcode any status information returned from the printer 106. In this case, the printer script 122 may be either specific to the printer 106 or may be a generic script for a printer command set and/or printer language that the printer 106 supports.

In this example system, the print server device 104 includes a print server manager 110, such as a software application (e.g., computer-executable instructions), that can be executed by a processor, or memory and processor system, to implement aspects of a configurable print server device as described herein. The print server manager 110 may be integrated in an operating system of the device, or alternatively, may be implemented as an independent application that is executable on the device to manage and control network access. Generally, the print server manager 110 may be implemented and/or described in the general context of software, firmware, hardware (e.g., fixed logic circuitry), applications, modules, or any combination thereof. In implementations, the print server device 104 and other components may be implemented as a system-on-chip (SoC) in the print server device 104, such as described with reference to the example SoC shown in FIG. 2

The print server device 104 can receive print jobs from the computer 102 through a communication interface, in which case the print job is passed to the printer 106 with or without alteration, as described above, by the print server device 104. Alternatively, the print server device 104 may operate without a connection to a computer and may operate in a standalone mode, in which case the print server device 104 may receive print jobs from devices 108 over the network 128. Also, the print server device 104 may be connected to the devices 108 over the network 128 and be connected to the computer 102 over a communication interface. In this case, the print server device 104 can receive print jobs from both the computer 102 and the devices 108.

Figure 2:
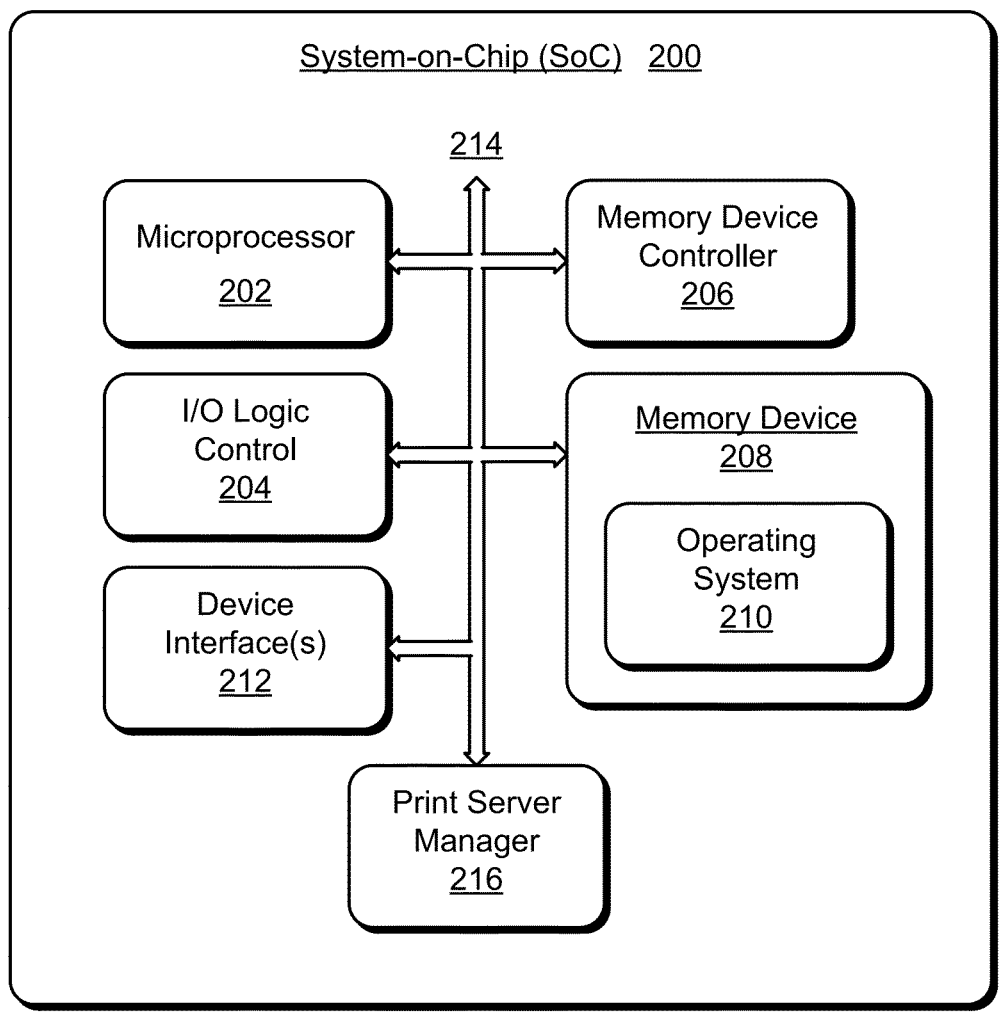
FIG. 2 illustrates an example system-on-chip (SoC) environment in which aspects of a configurable print server device can be implemented.

FIG. 2 illustrates an example system-on-chip (SoC) 200, which can implement various aspects of a configurable print server device as described herein. The SoC may be implemented in any type of print server device, such as the print server device 104 described with reference to FIG. 1. The print server device 104 may be a standalone device or implemented in any type of gateway device, access point, switch, router, or similar device. The SoC 200 can be integrated with electronic circuitry, a microprocessor, memory, input-output (I/O) logic control, communication interfaces and components, as well as other hardware, firmware, and/or software to implement a print server device 104.

In this example, the SoC 200 is integrated with a microprocessor 202 (e.g., any of a microcontroller or digital signal processor) and input-output (I/O) logic control 204 (e.g., to include electronic circuitry). The SoC 200 includes a memory device controller 206 and a memory device 208, such as any type of a nonvolatile memory and/or other suitable electronic data storage device. The SoC can also include various firmware and/or software, such as an operating system 210 that is maintained by the memory and executed by the microprocessor.

The SoC 200 includes a device interface 212 to interface with a device or other peripheral component, such as when installed in the print server device 104 as described herein. The SoC 200 also includes an integrated data bus 214 that couples the various components of the SoC for data communication between the components. The data bus in the SoC may also be implemented as any one or a combination of different bus structures and/or bus architectures.

In aspects of a configurable print server device, the SoC 200 includes a print server manager 216 that can be implemented as computer-executable instructions maintained by the memory device 208 and executed by the microprocessor 202. Alternatively, the print server manager 216 can be implemented as hardware, in firmware, fixed logic circuitry, or any combination thereof that is implemented in connection with the I/O logic control 204 and/or other processing and control circuits of the SoC 200. Examples of the print server manager 216, as well as corresponding functionality and features, are described with reference to the print server manager 110 shown in FIG. 1.

Example methods 300, 400, and 500 are described with reference to respective FIGS. 3, 4, and 5 in accordance with one or more aspects of a configurable print server device. Generally, any of the services, functions, methods, procedures, components, and modules described herein can be implemented using software, firmware, hardware (e.g., fixed logic circuitry), manual processing, or any combination thereof. A software implementation represents program code that performs specified tasks when executed by a computer processor. The example methods may be described in the general context of computer-executable instructions, which can include software, applications, routines, programs, objects, components, data structures, procedures, modules, functions, and the like. The program code can be stored in one or more computer-readable storage media devices, both local and/or remote to a computer processor. The methods may also be practiced in a distributed computing environment by multiple computer devices. Further, the features described herein are platform-independent and can be implemented on a variety of computing platforms having a variety of processors.

Figure 3:
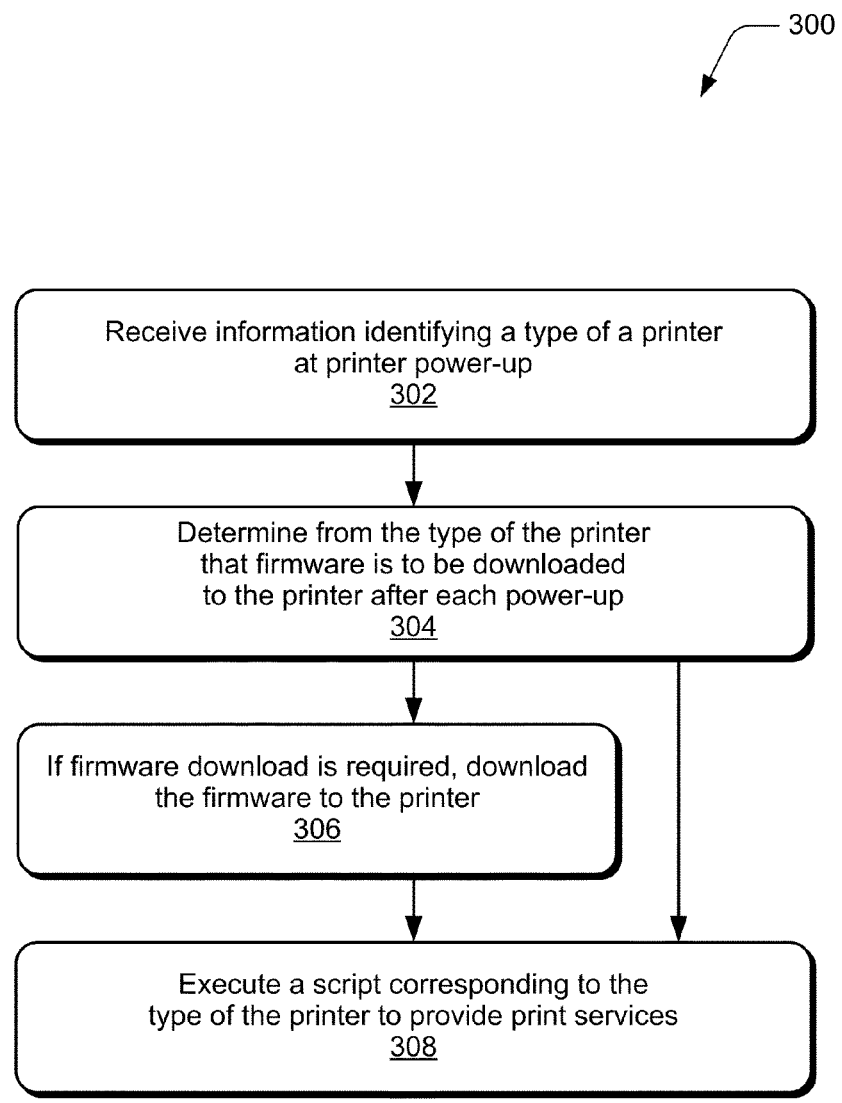
FIG. 3 illustrates example methods of a configurable print server device in accordance with one or more aspects.

FIG. 3 illustrates example method 300 of a configurable print server device, and is described with reference to the print server device 104. The order in which the method is described is not intended to be construed as a limitation, and any number of the described method operations can be combined in any order to implement the method, or an alternate method.

At 302, information identifying a type of a printer is received at printer power-up. For example, the printer server manager 110 that is implemented by the printer server device 104 receives, from the printer 106, the printer identification information, which identifies the type of the printer 106, when the printer 106 powers-up and enumerates the identification information across a communication interface to the print server device 104. The identification information may be in the form of an IEEE 1284 string, or any other suitable conveyance, and may contain such information as a PID, a VID, manufacturer, model, version, printer command sets and/or printer languages, and the like, supported by the printer 106.

At 304, a determination is made from the type of the printer as to whether firmware is to be downloaded to the printer after each power-up. For example, the print server manager 110 determines, based on the type of the printer 106, if power has been cycled on the printer 106 and if firmware is to be downloaded and installed after each power cycle of the printer 106. Optionally (at 306), if firmware is to be downloaded, the printer firmware downloader 114 will download the printer firmware 124 to the printer 106.

At 308, a script corresponding to the type of the printer is executed to provide print services. For example, the print server manager 110 executes the printer script 122 that corresponds to the printer 106 using the script engine 116 to provide print services for the printer 106.

Figure 4:
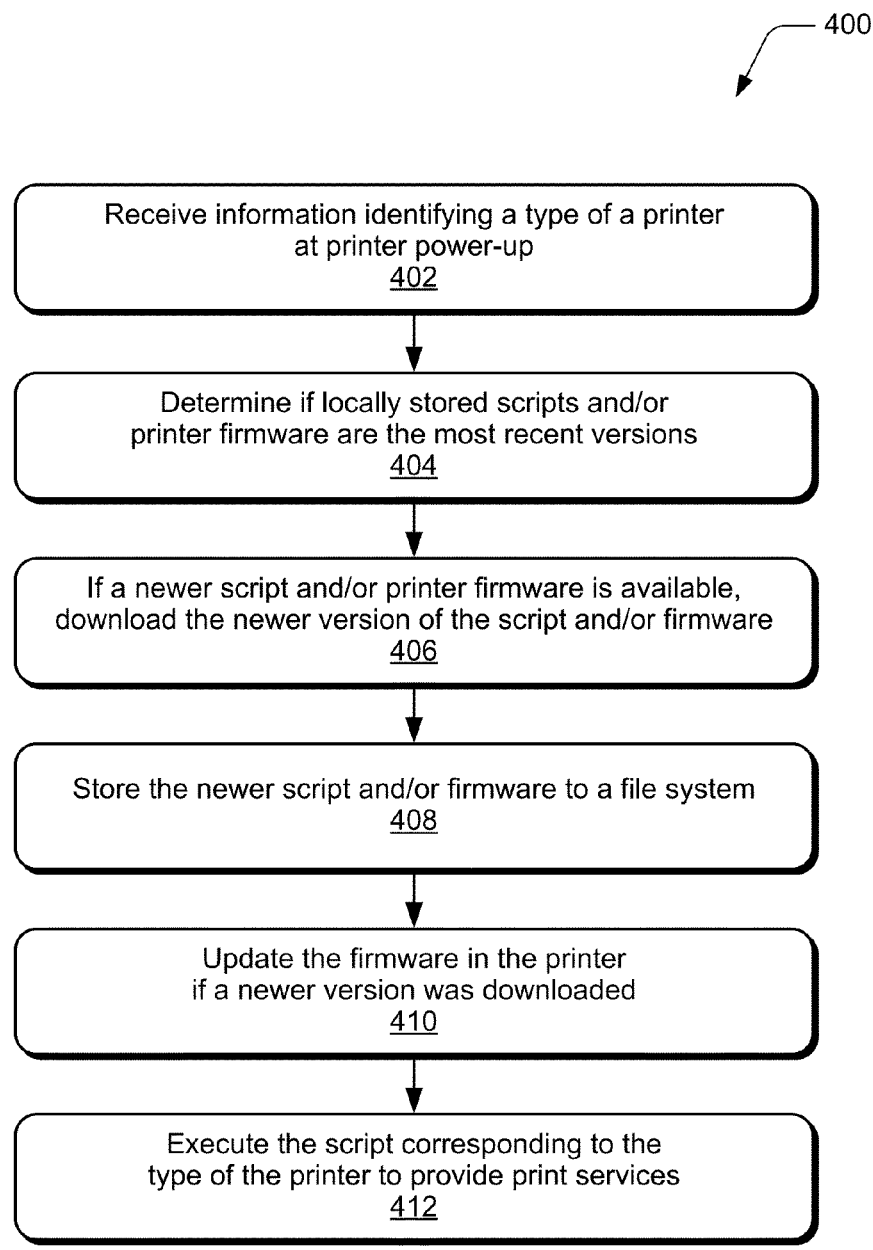
FIG. 4 illustrates example methods of a configurable print server device in accordance with one or more aspects.

FIG. 4 illustrates example method 400 of a configurable print server device, and is described with reference to the print server device 104. The order in which the method is described is not intended to be construed as a limitation, and any number of the described method operations can be combined in any order to implement the method, or an alternate method.

At 402, information identifying a type of a printer is received at printer power-up. For example, the printer server manager 110 that is implemented by the printer server device 104 receives, from the printer 106, the printer identification information, which identifies the type of the printer 106, when the printer 106 powers-up and enumerates the identification information across a communication interface to the print server device 104. The identification information may be in the form of an IEEE 1284 string, or any other suitable conveyance, and may contain such information as a PID, a VID, manufacturer, model, version, printer command sets and/or printer languages, and the like, supported by the printer 106.

At 404, a determination is made from the type of the printer as to whether the locally stored scripts and/or the printer firmware are the most recent versions available. For example, the version manager 112 determines if the printer scripts 122 and/or the printer firmware 124 stored locally on the file system 120 are the most recent versions, by comparing the versions against the versions available in the printer script files 132 and/or the printer firmware files 134 stored on the update server 130.

At 406, a determination is made from the version information as to whether a newer printer script and/or a newer printer firmware version are available, and are to be downloaded. For example, the version manager 112 determines, based on comparing the versions of the printer script 122 and/or the printer firmware 124 with the versions of the printer script files 132 and/or the printer firmware files 134 on the update server 130, to download newer versions of the printer script 122 and/or the printer firmware 124 over the network 128 from the update server 130.

At 408, newer versions of the printer script and/or the printer firmware are stored in the file system. For example, the version manager 112 stores the newer version of the printer script 122 and/or the newer version of printer firmware 124 in the file system 120.

At 410, a determination is made, based on a comparison of the version of the downloaded printer firmware with the version of the printer firmware installed on the printer, to download the newer version of the printer firmware to be installed on the printer. For example, the version manager 112 compares the version of the printer firmware 124 stored in the file system 120 with the version of the printer firmware installed in the printer 106, and based on determining that the version of the printer firmware 124 is more recent, the printer firmware downloader 114 downloads the printer firmware 124 to the printer 106 for installation.

At 412, a script corresponding to the type of the printer is executed to provide print services. For example, the printer server manager 110 executes the printer script 122 that corresponds to the printer 106 using the script engine 116 to provide print services for the printer 106.

Figure 5:
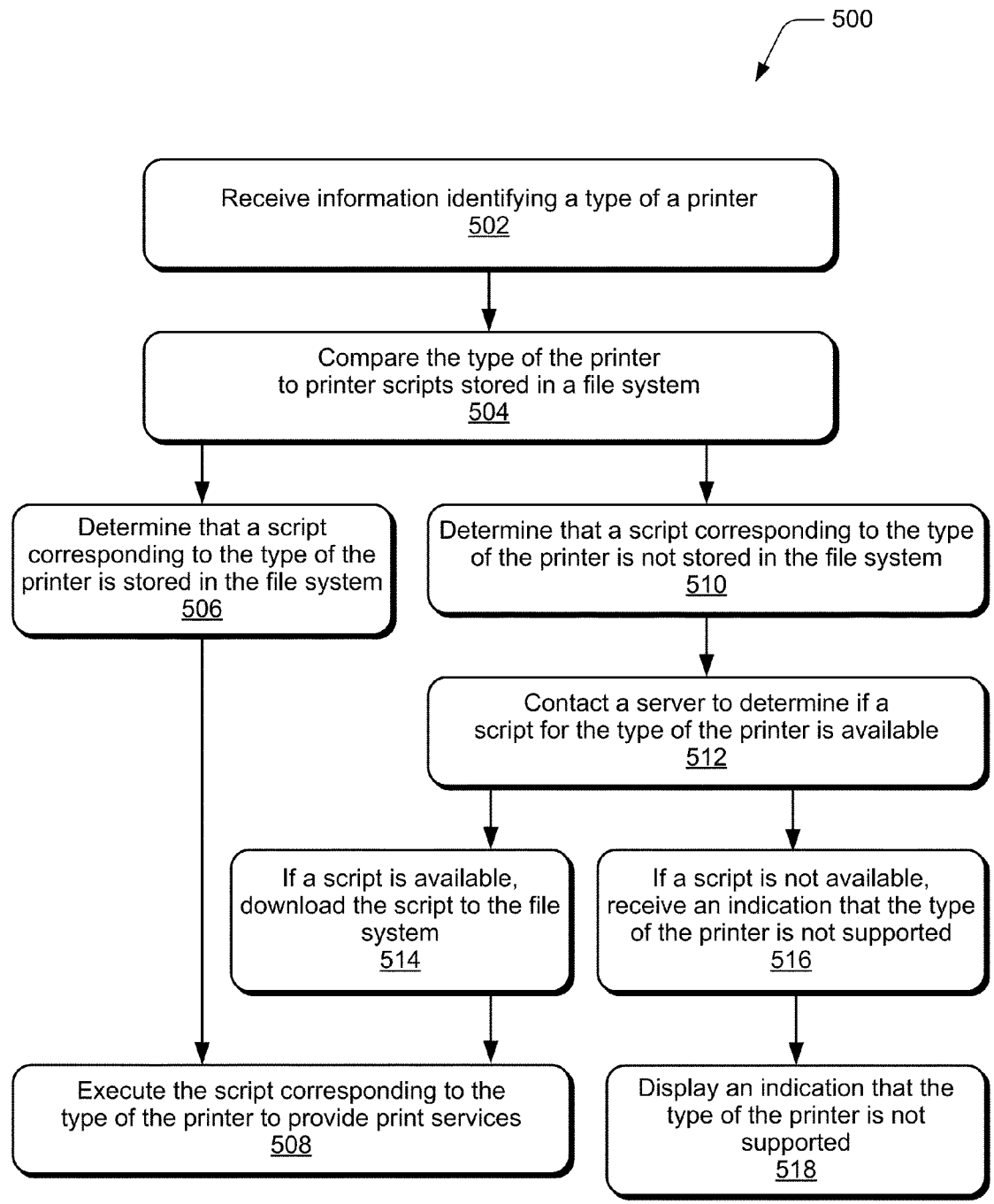
FIG. 5 illustrates example methods of a configurable print server device in accordance with one or more aspects.

FIG. 5 illustrates example method 500 of a configurable print server device, and is described with reference to the print server device 104. The order in which the method is described is not intended to be construed as a limitation, and any number of the described method operations can be combined in any order to implement the method, or an alternate method.

At 502, information identifying a type of a printer is received at printer power-up. For example, the printer server manager 110 that is implemented by the printer server device 104 receives, from the printer 106, the printer identification information, which identifies the type of the printer 106, when the printer 106 powers-up and enumerates the identification information across a communication interface to the print server device 104. The identification information may be in the form of an IEEE 1284 string, or any other suitable conveyance, and may contain such information as a PID, a VID, manufacturer, model, version, printer command sets and/or printer languages, and the like, supported by the printer 106.

At 504, a comparison is made, between the type of the printer and printer scripts stored in a file system, as to whether any locally stored scripts correspond to the type of the printer. For example, the version manager 112 compares the printer scripts 122 stored in the file system 120 with the type of the printer 106 determined from the identification information enumerated by the printer 106.

At 506, a determination is made from version information as to whether a printer script that corresponds to the type of the printer is stored in the file system. For example, version manager 112 determines that the printer script 122 corresponding to the type of the printer 106 is stored in the file system 120. At 508, a script corresponding to the type of the printer is executed to provide print services. For example, the printer server manager 110 executes the printer script 122 that corresponds to the type of the printer 106 using the script engine 116 to provide print services for the printer 106.

At 510, a determination is made from the type of the printer that a printer script that corresponds to the type of the printer is not stored in the file system. For example, version manager 112 determines that a printer script 122 corresponding to the type of the printer 106 is not stored in the file system 120.

At 512, a determination is made from the type of the printer that the printer script that corresponds to the type of the printer is available from a server. For example, the version manager 112 contacts the update server 130 to determine if a printer script 122 corresponding to the type of the printer 106 is available from the update server 130. At 514, a determination is made from the type of the printer as to whether the printer script that corresponds to the type of the printer is available from the server and the printer script is downloaded from the server to the file system. For example, if the printer script 122 corresponding to the type of the printer 106 is available from the update server 130, the version manager 112 downloads the printer script 122 from the update server 130 and stores the printer script 122 in the file system 120. At 508, a script corresponding to the type of the printer is executed to provide print services. For example, the print server manager 110 executes the printer script 122 that corresponds to the printer 106 using the script engine 116 to provide print services for the printer 106.

Alternatively at 512, a determination is made from the type of the printer that a printer script that corresponds to the type of the printer is not available from the server. For example, the version manager 112 contacts the update server 130 to determine if the printer script 122 corresponding to the type of the printer 106 is available from the update server 130. At 516, an indication is received from the server that there is no printer script available that corresponds to the type of the printer. For example, the version manager 130 receives an indication from the update server 130 that there is no printer script corresponding to the type of the printer. At 518, an indication is displayed that the type of the printer is not supported. For example, the print server manager 110 displays an indication that the type of the printer 106 is not supported.

Figure 6:
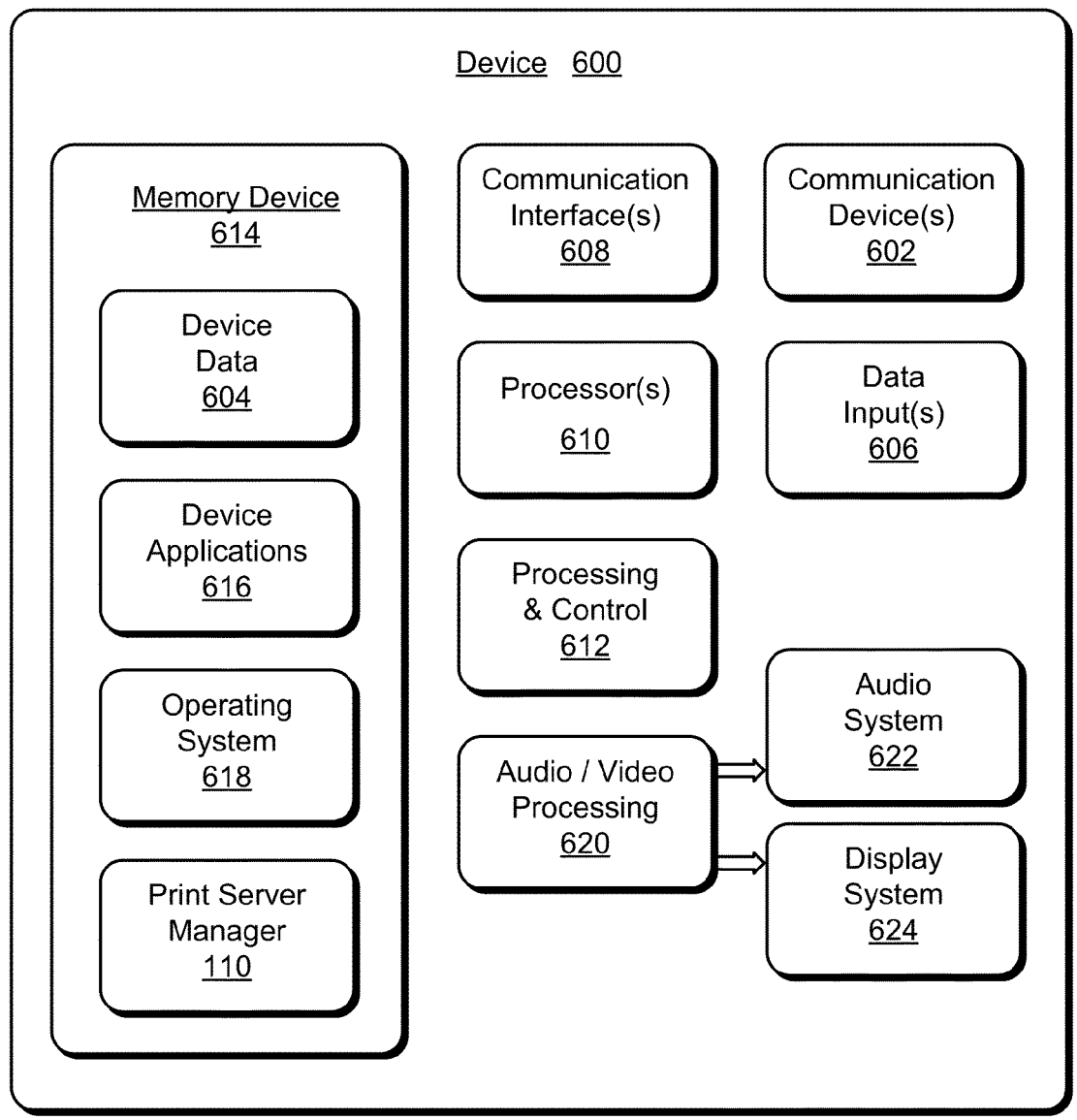
FIG. 6 illustrates various components of an example device that can implement aspects of a configurable print server device.

FIG. 6 illustrates various components of an example device 600 that can be implemented as any of the devices or servers described with reference to the previous FIGS. 1-5, such as any type of a device 108 that can send a print job to the print server device 104, a print server device 104 (e.g., a standalone print server, or a print server implemented in a gateway device, switch, router, and the like), the printer 106, or the computer 102 and any other type of electronic and/or computing device. The device may also be implemented to include the example system-on-chip (SoC) described with reference to FIG. 2. The device may be associated with a user (i.e., a person) and/or an entity that operates the device such that a device describes logical devices that include users, software, firmware, hardware, and/or a combination of devices.

The device 600 includes communication devices 602 that enable wired and/or wireless communication of device data 604, such as received data, data that is communicated between devices, data packets of the data, etc. The device 600 also includes one or more data inputs 606 via which any type of data, media content, and/or inputs can be received, such as user-selectable inputs and any other type of audio, video, and/or image data received from any content and/or data source. The data inputs 606 may include USB ports, coaxial cable, and other serial or parallel connectors (including internal connectors) for flash memory, DVDs, CDs, and the like. The data inputs can be used to couple the device to internal and/or external components, peripherals, and accessories, such as keyboards, microphones, cameras, and any other types of devices.

The device 600 also includes communication interfaces 608, such as any one or more of a serial, parallel, network, or wireless interface. The communication interfaces provide a connection and/or communication links between the device and the network 128 by which other electronic, computing, and communication devices communicate data with the device. Although not shown, the device can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

The device 600 includes one or more processors 610 (e.g., any of microprocessors, controllers, and the like), or a processor and memory system (e.g., implemented in an SoC), which processes computer-executable instructions to control the operation of the device. Alternatively or in addition, the device can be implemented with any one or combination of software, hardware, firmware, or fixed logic circuitry that is implemented in connection with processing and control circuits which are generally identified at 612.

The device 600 also includes one or more memory devices 614 (e.g., computer-readable storage media) that enable data storage, such as random access memory (RAM), non-volatile memory (e.g., read-only memory (ROM), flash memory, etc.), and a disk storage device. A disk storage device may be implemented as any type of magnetic or optical storage device, such as a hard disk drive, a recordable and/or rewriteable disc, and the like. The device may also include a mass storage media device. Computer-readable storage media can be any available medium or media that is accessed by a computing device.

A memory device 614 provides data storage mechanisms to store the device data 604, other types of information and/or data, such as the printer scripts 122 and the printer firmware 124, and device applications 616. For example, an operating system 618 can be maintained as a software application with the memory device and executed on the processors. The device applications may also include a device manager or controller, such as any form of a control application, software application, signal processing and control module, code that is native to a particular device, a hardware abstraction layer for a particular device, and so on. In this example, the device applications 616 also include a print server manager 110 to implement aspects of a configurable print server device when the device 600 is implemented as the print server device 104. Although shown implemented as a software application or module in the example device 600, the print server manager 110 may be implemented in the general context of software, firmware, hardware (e.g., fixed logic circuitry), or any combination thereof.

The device 600 may also include an audio and/or video processing system 620 that generates audio data for an audio system 622 and/or generates display data for a display system 624. The audio system and/or the display system may include any devices that process, display, and/or otherwise render audio, video, display, and/or image data. In implementations, the audio system and/or the display system are external components to the device. Alternatively, the audio system and/or the display system are integrated components of the example device.

Although aspects of a configurable print server device have been described in language specific to features and/or methods, the subject of the appended claims is not necessarily limited to the specific features or methods described. Rather the specific features and methods are disclosed as example implementations of a configurable print server device.

What is claimed is:

1. A print server device, comprising:
   a network interface configured to receive, via a network, a print job in a first format, from a network-connected device;
   a communication interface configured to communicate with a printer, the printer supporting print jobs in a second, preconfigured format;
   a memory comprising computer instructions for a print server manager, and configured to maintain a script that is designed for the printer, the script directing operations of the print server manager; and
   a processor configured to execute the computer instructions to implement the print server manager, the print server manager configured to:
      receive, via the communication interface, information identifying a type of the printer;
      determine, based on the information identifying the type of the printer, whether an updated version of the script is available from a server on the network;
      responsive to the updated version of the script being available from the server on the network:
         (i) update the print server manager with the updated script from the server; and
         (ii) execute, on the print server device, the updated script to transcode the print job in the first format to the second, preconfigured format that is supported by the printer.

2. The print server device as recited in claim 1, wherein the print server manager is further configured to:
   determine that there is no script available that is designed for the type of the printer;
   determine, based on the type of the printer, that a generic script will support the operations of the print server manager for the printer; and
   update the printer server device with the generic script.

3. The print server device as recited in claim 1, wherein the print server manager is further configured to:
   determine that an updated version of firmware for the printer is available from the server;
   download the updated version of the firmware from the server;
   store the updated version of the firmware in the print server device; and
   update the printer with the updated version of the firmware.

4. The print server device as recited in claim 1, wherein the print server manager is further configured to:

determine, from the received information identifying the type of the printer, that power was cycled on the printer;

determine that firmware for the printer is to be installed on the printer after each power cycle; and communicate the firmware stored on the print server device to the printer.

5. The print server device as recited in claim 1, wherein the network interface is a wireless network interface and the print server device receives the print job from a wireless mobile device that transmits the print job through the wireless network interface to the print server device.

6. The print server device as recited in claim 5, wherein the script is configured to transcode status information, received from the printer, from the second, preconfigured format into the first format that is supported by the wireless mobile device.

7. The print server device as recited in claim 5, wherein the print server device is configured to operate as a standalone wireless device and is configurable to join the wireless network.

8. The print server device as recited in claim 1, wherein:
the memory is configured to maintain a file system; and
the print server manager is configured to store updates from the update server in the file system.

9. A method, comprising:
executing with a processor of a print server device, computer instructions implementing a print server manager to receive a print job in a first format, the print server manager configured for:
receiving, at the print server manager, information identifying a type of a printer, the printer supporting print jobs in a second, preconfigured format;
determining that a script that is designed for the type of the printer is not available, the script being configured to direct operations of the print server manager;
determining, responsive to said determining that the script is not available and based on the type of the printer, that a generic script will support operations of the print server manager for printing with the printer; and
executing the generic script to support the operations of the print server manager for the printer.

10. The method as recited in claim 9, wherein said executing the generic script further comprises transcoding the print job from the first format into the second, preconfigured format that is supported by the printer.

11. The method as recited in claim 9, further comprising:
determining, from the received information identifying the type of the printer, that power was cycled on the printer;
determining that firmware for the printer is to be installed on the printer after each power cycle; and
communicating the firmware stored on the print server device to the printer.

12. The method as recited in claim 9, further comprising:
connecting the print server device to a wireless network; and
receiving the print job from a wireless mobile device over the wireless network.

13. The method as recited in claim 12, wherein said executing the generic script further comprises transcoding the print job from the first format that is supported by the wireless mobile device into the second, predetermined format that is supported by the printer.

14. The method as recited in claim 9, further comprising:
determining that an updated version of the generic script is available from a server;
updating the print server device with the updated generic script from the server; and
executing the updated generic script by the print server device to support the operations of the print server manager for the printer.

15. A print server system, comprising:
a network interface configured to receive, via a network, a print job in a first format, from a network-connected device;
one or more communication interfaces configured to communicate with a printer, the printer supporting print jobs in a second, preconfigured format;
a memory comprising computer instructions for a print server manager and configured to maintain a script that is designed for the printer to support operations of the print server manager, the script directing operations of the print server manager;
a processor configured to execute the computer instructions to implement the print server manager, the print server manager configured to:
receive, via the communication interface, information identifying a type of the printer;
determine, based on the information identifying the type of the printer, whether the script that is designed for the type of the printer is available;
determine, based on said determination that the script designed for the type of the printer is not available, that a generic script that will support the operations of the print server manager for printing with the printer; and
execute the generic script to support the operations of the print server manager for the printer.

16. The print server system as recited in claim 15, wherein the execution of the generic script transcodes the print job from the first format into the second, preconfigured format that is supported by the printer.

17. The print server system as recited in claim 15, wherein the print server manager is further configured to:
determine, from the received information identifying the type of the printer, that power was cycled on the printer;
determine that firmware for the printer is to be installed on the printer after each power cycle; and
communicate the firmware stored on the print server device to the printer.

18. The print server system as recited in claim 15, wherein the network interface is a wireless network interface, and the print server manager is further configured to:
connect the print server system to a wireless network through the wireless network interface;
receive the print job from a wireless mobile device over the wireless network; and
execute the generic script to transcode the print job from the first format that is supported by the wireless mobile device into the second preconfigured format that is supported by the printer.

19. The print server system as recited in claim 15, wherein the print server manager is further configured to:
determine that an updated version of the generic script is available from a server;
update the print server device with the updated generic script from the server; and
execute the updated generic script to support the operations of the print server manager for the printer.

20. The print server system as recited in claim 15, wherein the system is a System-on-Chip (SoC).

* * * * *